United States Patent
Seo et al.

(10) Patent No.: US 9,729,815 B2
(45) Date of Patent: Aug. 8, 2017

(54) METHOD AND ELECTRONIC DEVICE FOR CONTROLLING CONTENT INTEGRITY USING NUMERICAL DATA

(71) Applicant: Samsung Electronics Co., Ltd., Gyeonggi-do (KR)

(72) Inventors: J Seo, Gyeonggi-do (KR); Tae-Gun Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/461,244

(22) Filed: Aug. 15, 2014

(65) Prior Publication Data

US 2015/0049901 A1 Feb. 19, 2015

(30) Foreign Application Priority Data

Aug. 16, 2013 (KR) .................. 10-2013-0097154

(51) Int. Cl.
| | |
|---|---|
| G06K 9/00 | (2006.01) |
| H04N 5/913 | (2006.01) |
| H04N 21/44 | (2011.01) |
| H04N 21/8358 | (2011.01) |
| H04N 21/431 | (2011.01) |
| H04N 21/442 | (2011.01) |
| H04N 21/8352 | (2011.01) |
| G06T 1/00 | (2006.01) |

(52) U.S. Cl.
CPC ............ *H04N 5/913* (2013.01); *G06T 1/0028* (2013.01); *H04N 21/4318* (2013.01); *H04N 21/44008* (2013.01); *H04N 21/44236* (2013.01); *H04N 21/8352* (2013.01); *H04N 21/8358* (2013.01); *G06T 2201/0081* (2013.01); *H04N 2005/91335* (2013.01)

(58) Field of Classification Search
None
See application file for complete search history.

(56) References Cited

U.S. PATENT DOCUMENTS

| | | | | |
|---|---|---|---|---|
| 7,253,917 | B2* | 8/2007 | Umeda | H04N 1/00326 358/1.15 |
| 7,443,999 | B2* | 10/2008 | Muratani | G06T 1/005 348/E7.056 |
| 8,243,980 | B2* | 8/2012 | Rhoads | G06K 9/00442 382/100 |
| 2002/0191216 | A1* | 12/2002 | Umeda | H04N 1/00326 358/1.15 |
| 2004/0098593 | A1* | 5/2004 | Muratani | G06T 1/005 713/176 |
| 2007/0047442 | A1* | 3/2007 | Snyder | G06F 21/16 370/235 |
| 2007/0064973 | A1* | 3/2007 | Meaney | G06T 1/0028 382/100 |

(Continued)

FOREIGN PATENT DOCUMENTS

| | | |
|---|---|---|
| KR | 10-2013-0018368 | 2/2013 |
| KR | 10-2013-0020025 | 2/2013 |
| KR | 10-2013-0023106 | 3/2013 |

*Primary Examiner* — Tahmina Ansari

(57) ABSTRACT

A method and an apparatus for controlling content integrity. A method for operating in an electronic device can include including unique information of content in a watermark image, and inserting the watermark image to the content.

20 Claims, 15 Drawing Sheets

(56) References Cited

U.S. PATENT DOCUMENTS

2009/0031134 A1\* 1/2009 Levy .................... G06T 1/0071
713/176
2015/0049901 A1\* 2/2015 Seo .................. H04N 21/44008
382/100

\* cited by examiner

METHOD AND ELECTRONIC DEVICE FOR CONTROLLING CONTENT INTEGRITY USING NUMERICAL DATA

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Aug. 16, 2013, and assigned Serial No. 10-2013-0097154, the entire disclosure of which is hereby incorporated by reference.

TECHNICAL FIELD

The present disclosure relates generally to a method for controlling content integrity and an electronic device thereof.

BACKGROUND

As information communication technology and semiconductor technology advance, various electronic devices develop into multimedia devices for providing diverse multimedia services. For example, a portable electronic device can provide various multimedia services such as broadcasting service, wireless Internet service, camera service, and music play service.

The content serviced by the electronic device can be modified and shared by a third party, against original intention of a content provider. In this case, the third party may maliciously modify and share the content. Hence, a method for displaying whether the original content is compromised is demanded.

SUMMARY

To address the above-discussed deficiencies, it is a primary aspect of the present disclosure to provide a method and an apparatus for including content unique information in a watermark image.

Another aspect of the present disclosure is to provide a method and an apparatus for encrypting and including content unique information in a watermark image.

Yet another aspect of the present disclosure is to provide a method and an apparatus for inserting a watermark image including content unique information to the content.

Still another aspect of the present disclosure is to provide a method and an apparatus for detecting a watermark image in content.

A further aspect of the present disclosure is to provide a method and an apparatus for comparing content unique information and original content unique information of a watermark image.

A further aspect of the present disclosure is to provide a method and an apparatus for changing a display type of a watermark image when content unique information and original content unique information of the watermark image are different from each other.

A further aspect of the present disclosure is to provide a method and an apparatus for changing a watermark image size when a display type of the watermark image is changed.

A further aspect of the present disclosure is to provide a method and an apparatus for including and displaying predefined text in a watermark image when a display type of the watermark image is changed.

A further aspect of the present disclosure is to provide a method and an apparatus for displaying an image different from a watermark image when a display type of the watermark image is changed.

A further aspect of the present disclosure is to provide a method and an apparatus for removing a displayed watermark image when a display type of the watermark image is changed.

A further aspect of the present disclosure is to provide a method and an apparatus for displaying predefined text separately from a displayed watermark image when content unique information and original content unique information of the watermark image are different from each other.

According to one aspect of the present disclosure, a method for controlling content integrity in an electronic device includes including unique information of content in a watermark image; and inserting the watermark image to the content.

According to another aspect of the present disclosure, an electronic device includes at least one processor; at least one memory; and at least one processor for including unique information of content in a watermark image and inserting the watermark image to the content.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
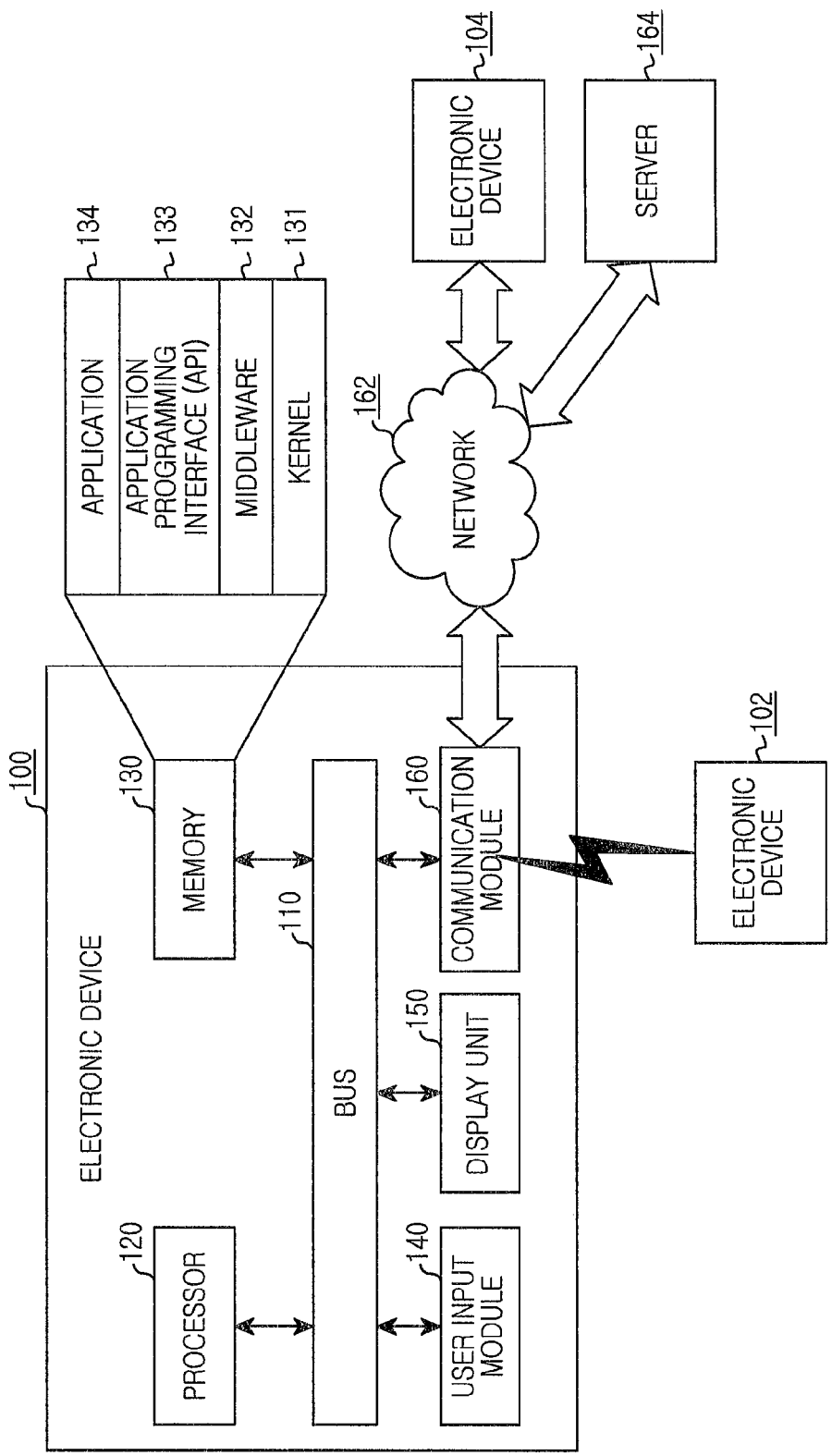
FIG. 1 is a block diagram of an electronic device according to an exemplary embodiment of the present disclosure.

FIGS. 1 through 10E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure can adopt one or more combinations of various devices including a smart phone, a tablet Personal Computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical appliance, an electronic bracelet, an electronic necklace, an electronic accessory, a camera, a wearable device, an electronic watch, a watch, a smart appliance (e.g., refrigerator, air conditioner, vacuum, artificial intelligence robot, television (TV), Digital Versatile Disc (DVD) player, audio system, oven, microwave oven, washing machine, air purifier, digital frame), medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), a set-top box, a TV box (e.g., Samsung HomeSync™, AppleTV™, Google TV™), an electronic dictionary, a in-vehicle infotainment, marine electronic equipment (e.g., marine navigation device, gyro compass), avionics, a security device, an e-textile, a digital key, a camcorder, a game console, a Head Mounted Display (HMD), a flat panel display, an electronic album, part of furniture or building/structure having a communication function, an electronic board, an electronic sign input device, and a projector. Those skilled in the art shall understand that the electronic device of the present disclosure is not limited those devices.

The present disclosure relates to a technique for changing a display type of a watermark when content is compromised, by inserting the watermark including unique information of the content to the content in an electronic device FIG. 1 is a block diagram of an electronic device according to an exemplary embodiment of the present disclosure.

Referring to FIG. 1, the electronic device 100 can include a bus 110, a processor 120, a memory 130, a user input module 140, a display unit 150, and a communication module 160.

The bus 110 can be a circuit for interlinking the components (e.g., the bus 110, the processor 120, the memory 130, the user input module 140, the display unit 150, and the communication module 160) of the electronic device 100 and transferring communication (e.g., control messages) between the components.

The processor 120 can receive an instruction from the components of the electronic device 100 via the bus 110, interpret the received instruction, and perform an operation or a data processing according to the interpreted instruction.

The memory 130 can store the instruction or the data received from or generated by the processor 120 or the other components (e.g., the user input module 140, the display unit 150, and the communication module 160). For example, the memory 130 can store at least one image.

The memory 130 can include at least one programming module including a kernel 131, middleware 132, an Application Programming Interface (API) 133, and an application 134. The programming module can be implemented using software, firmware, and hardware, or a combination of at least two of them.

The kernel 131 can control or manage system resources (e.g., the bus 110, the processor 120, or the memory 130) used to execute the operation or the function of other programming modules (e.g., the middle ware 132, the API 133, or the application 134). The kernel 131 can provide an interface allowing the middleware 132, the API 133, or the application 134 to access and control or manage the individual component of the electronic device 100.

The middleware 132 can relay data between the API 133 or the application 134 and the kernel 131. The middleware 132 can perform load balancing for a work request by giving priority of the system resource (e.g., the bus 110, the processor 120, or the memory 130) of the electronic device 100 to the work requests received from the at least one application 134.

The API 133, which is an interface for the application 134 to control the kernel 131 or the middleware 132, can include at least one interface or function for file control, window control, image processing, or text control.

The user input module 140 can receive and forward the instruction or the data from the user to the processor 120 or the memory 130 via the bus 110.

The display unit 150 can display an image, a video, or data to the user.

The communication module 160 can connect the communication between the electronic device 100 and other electronic devices 102 and 104. In so doing, the communication module 160 can support short-range communication protocol (e.g., Wireless Fidelity (Wi-Fi), Bluetooth (BT), Near Field Communication (NFC)), or communication network (e.g., Internet, Local Area Network (LAN), Wide Area Network (WAN), telecommunication network, cellular network, satellite network, or Plain Old Telephone Service (POTS), 162).

The other electronic devices 102 and 104 can be the same as or different from the electronic device 100.

Figure 2:
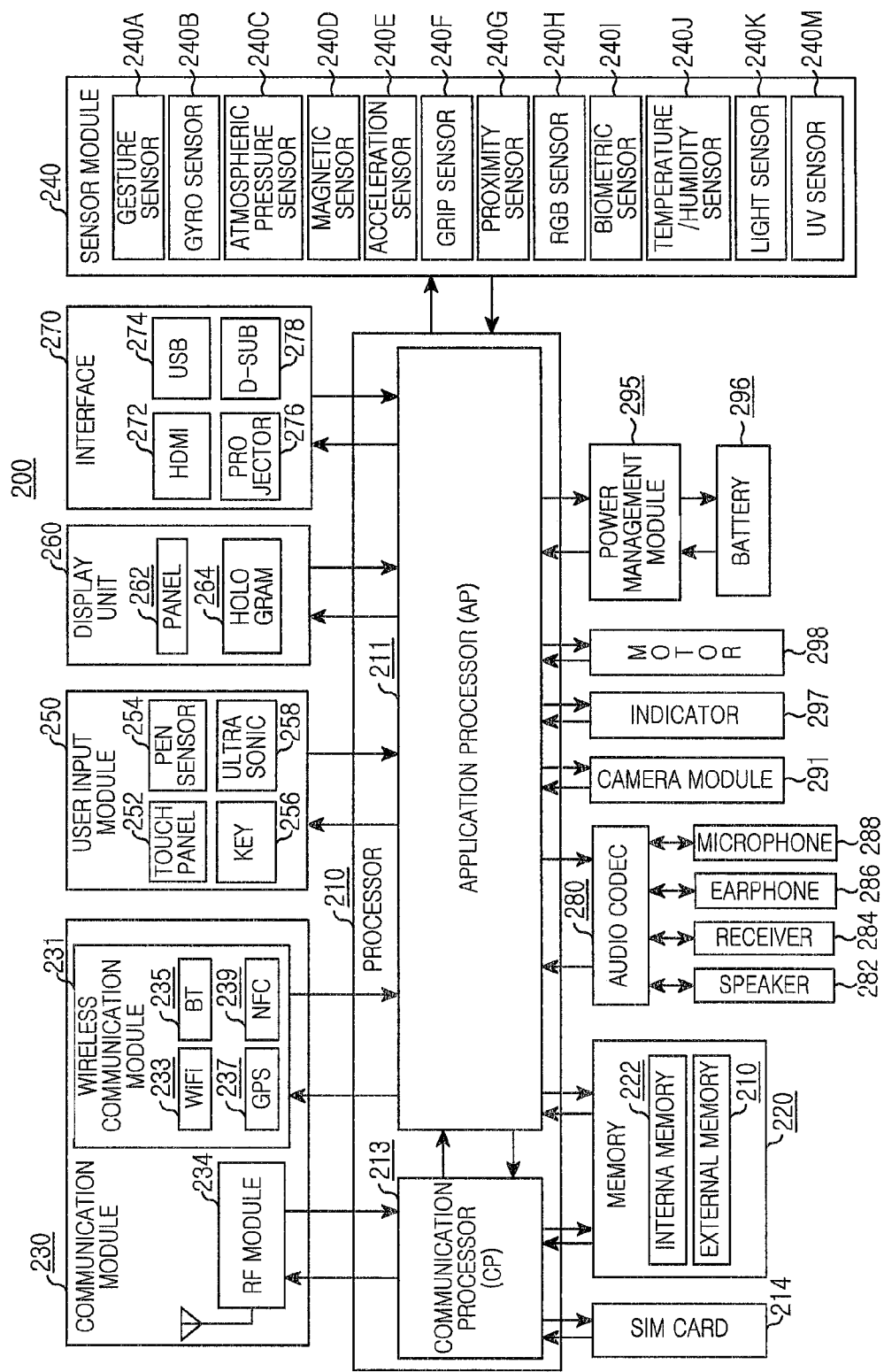
FIG. 2 is a block diagram of hardware according to an exemplary embodiment of the present disclosure.

FIG. 2 is a block diagram of hardware according to an exemplary embodiment of the present disclosure.

Referring to FIG. 2, the hardware 200 can include one or more processors 210, a Subscriber Identity Module (SIM) card 214, a memory 220, a communication module 230, a sensor module 240, a user input module 250, a display unit 260, an interface 270, an audio codec 280, a camera module 291, a power management module 295, a battery 296, an indicator 297, and a motor 298. Herein, the hardware 200 can be the electronic device 100 of FIG. 1.

The processor 210 can include one or more Application Processor (APs) 211 and one or more Communication Processors (CPs) 213. Herein, the processor 210 can be the processor 120 of FIG. 1.

While the AP 211 and the CP 213 are included in the processor 210 of FIG. 2, the AP 211 and the CP 311 can be included in different Integrated Circuit (IC) packages. The AP 211 and the CP 311 may be included in the single IC package. The processor 210 may further include a Graphics Processing Unit (GPU).

The AP 211 can control hardware or software components connected to the AP 211 by driving an operating system or an application program, and carry out data processing and operations including multimedia data. Herein, the AP 211 can be implemented using a System on Chip (SoC).

The CP 213 can manage data links and convert a communication protocol in the communication between the electronic device including the hardware 200 and the other electronic devices connected over the network. Herein, the CP 213 can be implemented using a SoC.

The CP 213 can perform at least part of the multimedia control function.

The CP 213 can identify and authenticate a terminal in the communication network using the SIM card 214. In so doing, the CP 213 can provide the user with a service including voice telephony, video telephony, text message, and packet data.

The CP 213 can control the data transmission and reception of the communication module 230.

While the components of the CP 213, the power management module 295, and the memory 220 are separated from the AP 211 in FIG. 2, the AP 211 can include part (e.g., the CP 213) of the components.

The AP 211 or the CP 213 can load and process the instruction or the data received from non-volatile memory or at least one of the other components, in a volatile memory. The 211 AP or the CP 213 can store data received from or generated by at least one of the other components, to the non-volatile memory.

The SIM card 214 can be inserted to a slot formed at a specific location of the electronic device. The SIM card 214 can include unique identification information (e.g., Integrated Circuit Card Identifier (ICCID)) or subscriber information (e.g., International Mobile Subscriber Identity (IMSI)).

The memory 220 can include an internal memory 222 and an external memory 224. Herein, the memory 220 can be the memory 130 of FIG. 1.

The internal memory 222 can include at least one of the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, NOR flash memory). The internal memory 222 may employ a Solid State Drive (SSD).

The external memory 224 can include at least one of a Compact Flash (CF), a Secure Digital (SD), a Micro-SD, a Mini-SD, an extreme digital (xD), and a memory stick.

The communication module 230 can include a wireless communication module 231 and a Radio Frequency (RF) module 234. Herein, the communication module 230 can be the communication module 160 of FIG. 1.

The wireless communication module 231 can provide a wireless communication function using a radio frequency. For example, the wireless communication module 231 can include a Wi-Fi 233, a BT 235, a GPS 237, and an NFC 239. For example, the wireless communication module 231 can include a network interface (e.g., LAN card) or a modem for connecting the hardware 200 to the network (e.g., Internet, LAN, WAN, telecommunication network, cellular network, satellite network, or POTS).

The RF module 234 can control the data transmission and reception including the transmission and reception of the RF signal or the paged electric signal. For example, the RF module 234 can includes a transceiver, a Pulse Amplitude Modulation (PAM), a frequency filter, or a Low Noise Amplifier (LNA). The RF module 234 can further include a component (e.g., conductor or conducting wire) for sending and receiving electromagnetic waves in free space in the wireless communication.

The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red Green Blue (RGB) sensor 240H, a biometric sensor 240I, a temperature/humidity sensor 240J, a light sensor 240K, and an UltraViolet (UV) sensor 240M. The sensor module 240 can measure a physical quantity or detect the operation status of the electronic device, and convert the measured or detected information to an electric signal. The sensor module 240 can include an E-noise sensor, an electromyography (EMG) sensor, an electroencephalogram (EEG) sensor, an electrocardiogram (ECG) sensor, or a finger print sensor. The sensor module 240 can further include a control circuit for controlling the one or more sensors of the sensor module 240.

The user input module 250 can include a touch panel 252, a pen sensor 254, a key 256, and an ultrasonic input device 258. Herein, the user input module 250 can be the user input module 140 of FIG. 1.

The touch panel 252 can recognize the touch input using at least one of capacitive, resistive, infrared, and Surface Acoustic Wave (SAW) techniques. Herein, the touch panel 252 may further include a controller. The capacitive touch panel can recognize not only the direct touch but also the proximity. The touch panel 252 may further include a tactile layer. In this case, the touch panel 252 can provide a tactile response to the user.

The pen sensor 254 can be implemented using the same or similar method as or to the user's touch input, or using a separate recognition sheet.

The key 256 can include a keypad or a touch key.

The ultrasonic input device 258, which obtains data by detecting microwave through a microphone 288 in the electronic device, allows radio frequency identification through the pen which generates an ultrasonic signal.

The hardware 200 may receive the user input from the external device (e.g., network 102, computer, server 164) connected using the communication module 230.

The display unit 260 can include a panel 262 or a hologram 264. Herein, the display unit 260 can be the display unit 150 of FIG. 1.

The panel 262 can employ a Liquid Crystal Display (LCD) or an Active Matrix Organic Light Emitting Diode (AMOLED). The panel 262 can be implemented flexibly, transparently, or wearably. Herein, the panel 262 may be constructed as the single module with the touch panel 252.

The hologram 264 can present a three-dimensional image in the air using interference of light.

The display unit 260 can further include a control circuit for controlling the panel 262 and the hologram 264.

The interface 270 can include a High Definition Multimedia Interface (HDMI) 272, a Universal Serial Bus (USB) 274, a projector 276, a D-sub 278, a SD/MMC, or IrDA.

The audio codec 280 can convert the voice to an electric signal and vice versa. For example, the audio codec 280 can convert voice information which is input or output through a speaker 282, a receiver 284, an earphone 286, or the microphone 288.

The camera module 291 can capture a still picture and a moving picture. For example, the camera module 291 can include one or more image sensors (e.g., front lens or rear lens), an Image Signal Processor (ISP), or a flash LED.

The power management module 295 can manage power of the hardware 200. For example, the power management module 295 can include a Power Management IC (PMIC), a charging IC, or a battery gauge. Herein, the PMIC can be mounted in an IC or a SoC semiconductor.

The charging type of the power management module 295 can be divided to a wired type and a wireless type.

The charging IC can charge the battery and prevent overvoltage or overcurrent from flowing from a charger. Herein, the charging IC can include a charging IC for at least one of the wired charging type or the wireless charging type. Herein, the wireless charging type includes magnetic resonance, magnetic induction, and microwave, and can further include an additional circuit (e.g., coil loop, resonance circuit, rectifier circuit) for the wireless charging.

The battery gauge can measure the remaining capacity of the battery 296 and the voltage, the current, or the temperature of the charging.

The battery 296 can supply the power by generating the electricity. For example, the battery 296 can be a rechargeable battery.

The indicator 297 can display a specific status (e.g., booting state, message state, or charging state) of the hardware 200 or part (e.g., AP 211) of the hardware 200.

The motor 298 can convert the electric signal to a mechanic vibration.

An MCU 299 can control the sensor module 240

In addition, the hardware 200 can further include a processor (e.g., GPU) for supporting mobile TV. For example, the processor for supporting the mobile TV can process media data in conformity with Digital Multimedia Broadcasting (DMB), Digital Video Broadcasting (DVB), or media flow standard.

The names of the hardware components of the present disclosure can differ according to the type of the electronic device. The hardware of the present disclosure can include at least one of the components, omit some components, or further include other components. Some of the hardware components can be united to the single entity to carry out the same functions of the corresponding components.

Figure 3:
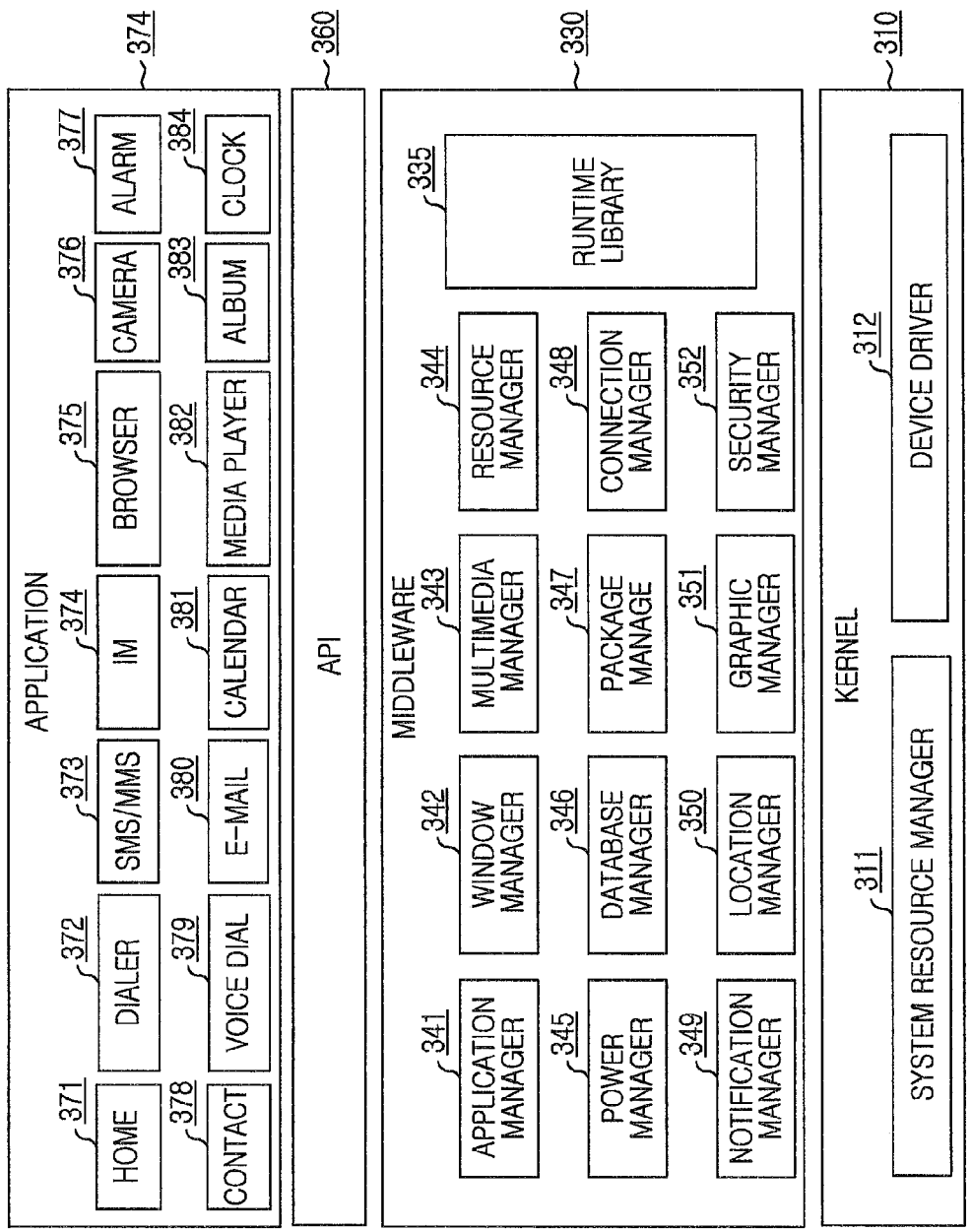
FIG. 3 is a block diagram of a programming module according to an exemplary embodiment of the present disclosure.

FIG. 3 is a block diagram of the programming module according to an exemplary embodiment of the present disclosure.

Referring to FIG. 3, the programming module 300 can include a kernel 310, a middleware 330, an API 360, and an application 370. Herein, the programming module 300 can be the electronic device 100 (e.g., included (e.g., stored) in the memory 130) of FIG. 1. At least part of the programming module 300 can include software, firmware, hardware, or a combination of at least two of them. The programming module 300 can include an Operating System (OS) for controlling resources of the electronic device 100 in the hardware 200, and various applications 370 driven in the OS. For example, the OS can include Android, iOS, Windows, Symbian, Tizen, and Bada.

The kernel 310 can include a system resource manager 311 and a device driver 312. Herein, the kernel 310 can be the kernel 131 of FIG. 1.

The system resource manager 311 can control, allocate, or withdraw the system resource. For example, the system resource manager 311 can include a process manager 313, a memory manager 315, and a file system manager 317.

The device driver 312 can include a display driver 314, a camera driver 316, a BT driver 318, a shared memory driver 320, a USB driver 322, a keypad driver 324, a Wi-Fi driver 326, an audio driver 328, and an IPC driver.

The middleware 330 can include a plurality of preset modules for providing the common function required by the application 370. Herein, the middleware 330 can be the middleware 132 of FIG. 1. The middleware 330 can allow the application 370 to efficiently use the limited system resources of the electronic device through the API 360. For example, the middleware 330 can include at least one of a runtime library 335, an application manager 341, a window manager 342, a multimedia manager 343, a resource manager 344, a power manager 345, a database manager 346, a package manage 347, a connection manager 348, a notification manager 349, a location manager 350, a graphic manager 351, and a security manager 352.

The runtime library 335 can include a library module used by a compiler to add a new function using a programming language while the application 370 is executed. For example, the runtime library 335 can function for input and output, memory management, and arithmetic function.

The application manager 341 can manage a life cycle of at least one of the application 370.

The window manager 342 can manage GUI resources used in the screen.

The multimedia manage 343 can identify a format required to play various media files, and encode or decode the media file using a code suitable for the corresponding format.

The resource manager 344 can manage a source code, a memory, a storage resource of at least one of the application 370.

The power manager 345 can manage the battery or the power in association with BIOS, and provide power information for the operation.

The database manager 346 can manage to generate, retrieve, or change a database to be used by at least one of the application 370. For example, the database manager 346 can manage harmful site information (Uniform Resource Locator (URL) or IP) stored in the memory 130.

The packet manager 347 can manage installation or update of the application distributed as a packet file.

The connection manager 348 can manage the wireless connection of the Wi-Fi or the BT.

The notification manager 349 can display or notify an event of an incoming message, an appointment, and proximity to the user without interruption.

The location manager 350 can manage location information of the electronic device.

The graphic manager 351 can manage graphical effect for the user or the related user interface of the graphic manager 351.

The security manager 352 can provide a security function for the system security or the user authentication.

In addition, when the electronic device 100 has a telephone function, the middleware 330 can further include a call manager for managing the voice or video call function of the electronic device.

The middleware 330 can generate and use a new middleware module by combining various functions of the internal component modules. The middleware 330 can provide a specialized module per OS so as to provide a differentiated function. The middleware 330 can dynamically eliminate some components or add new components. Hence, the exemplary embodiments of the present disclosure can omit some of the components, include other components, or be replaced by other components of similar functions.

The API 360, which is a set of API programming functions, can differ according to the OS. Herein the API 360 can be the API 133 of FIG. 1. For example, in Android and iOS, one API set can be provided per platform. In Tizen, one or more API sets can be provided.

The application 370 can include a preload application or a third party application. Herein, the application 370 can be the application 134 of FIG. 1.

The programming module 300 can be implemented using an instruction stored in a computer-readable storage medium. When the one or more processors 210 execute the instruction, the one or more processors 210 can perform the function corresponding to the instruction. The computer-readable storage medium can be the memory 260 of FIG. 2. Part of the programming module 300 can be realized (e.g., executed) by the processors 210. Part of the programming module 300 can include a module, a program, a routine, an instruction set, or a process for one or more functions.

The electronic device can further include a watermark generation module, a watermark detection module, and a content analysis module. The watermark generation module, the watermark detection module, and the content analysis module can reside in the application 134 or 370 or the middleware 132 or 330. For example, when a watermark generation event occurs while the content is provided, the watermark generation module can control to include content unique information in a watermark image. For example, when a content provision event occurs, the watermark detection module can detect whether the content includes the watermark image. When the content includes the watermark image, the content analysis module can determine whether the content is compromised by comparing the content unique information and original content unique information of the watermark image.

The names of the components of the programming module 300 can differ according to the type of the OS. The programming module can include at least one of the components, omit some components, or further include other components.

Figure 4:
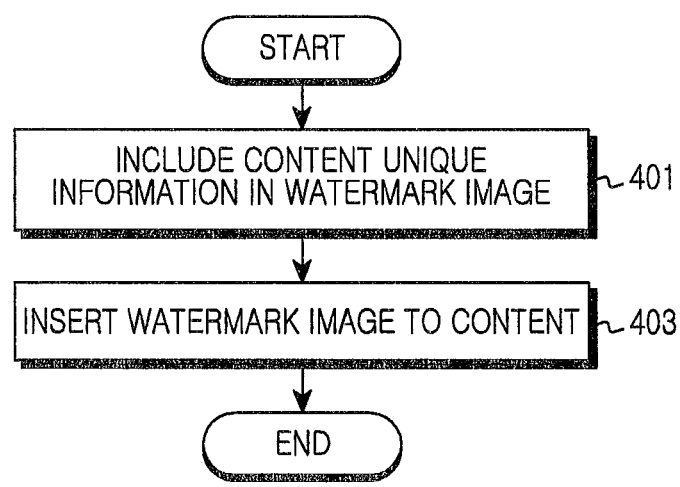
FIG. 4 is a flowchart of a process for inserting a watermark including content unique information to content in the electronic device according to an exemplary embodiment of the present disclosure.

FIG. 4 is a flowchart of a process for inserting the watermark including the content unique information to the content in the electronic device according to an exemplary embodiment of the present disclosure.

Referring to FIG. 4, the electronic device can include the content unique information in the watermark image in step 401. Herein, the content can include a document, an image, a video, or their combination. For example, in the document of the content, the electronic device can include document unique information in the watermark image. Herein, the document unique information can include at least one or a combination of a document capacity, a creation date, a modification date, the number of characters, the number of consonants, the number of vowels, the number of numerals, the number of alphabets, the number of symbols, and the number of images. The electronic device may encrypt and include the document unique information in the image.

Figure 7A:
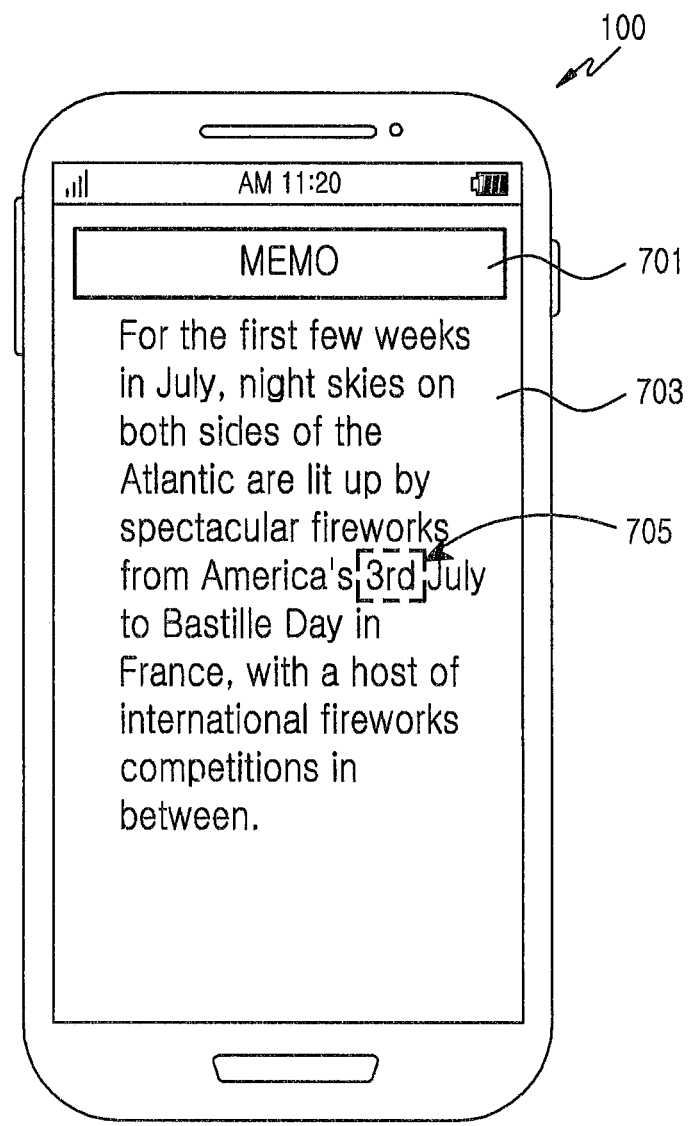
FIGS. 7A and 7B illustrate examples of a screen for inserting the watermark including the document unique information to the document in the electronic device according to an exemplary embodiment of the present disclosure.
Figure 7B:
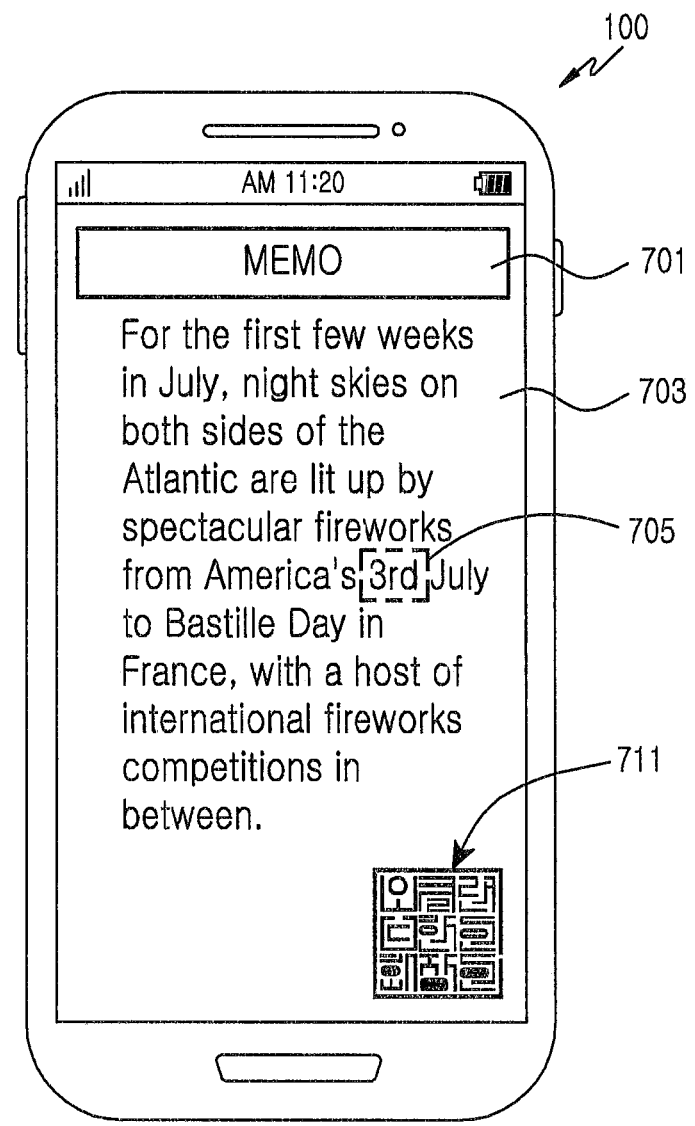

In step 403, the electronic device can insert the watermark image to the content. For example, the electronic device can insert a watermark image 711 including the document unique information to content 703 of a memo application 701 as shown in FIG. 7B. In so doing, the electronic device can determine one of at least one image stored in the memory, as the watermark image according to the user's selection. The electronic device may determine an image captured by the camera as the watermark image. The electronic device may determine a sign input by the user as the watermark image.

Next, the electronic device can finish this process.

Figure 5:
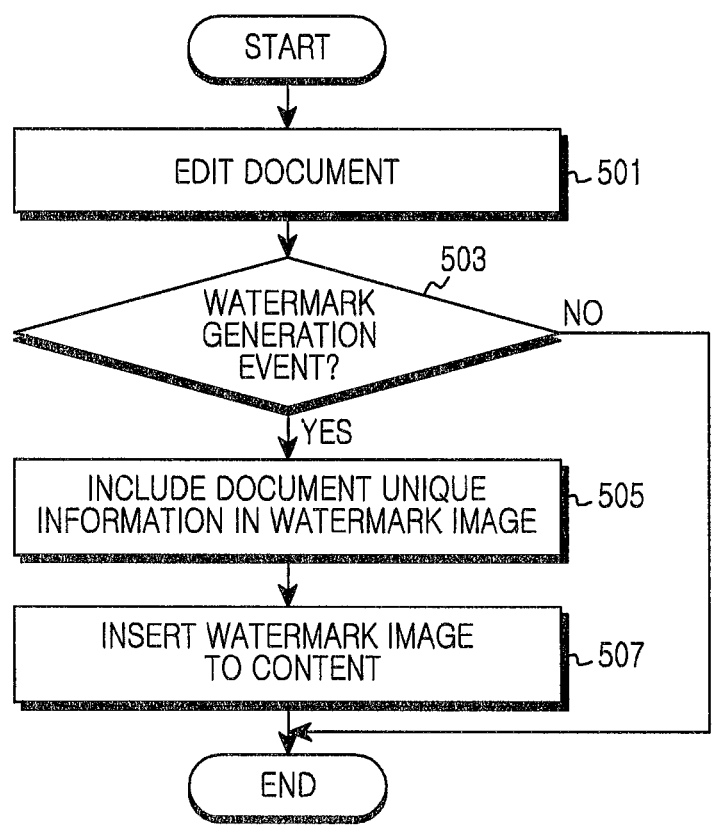
FIGS. 5 and 6 are flowcharts of processes for inserting the watermark including document unique information to a document in the electronic device according to an exemplary embodiment of the present disclosure.
Figure 6:
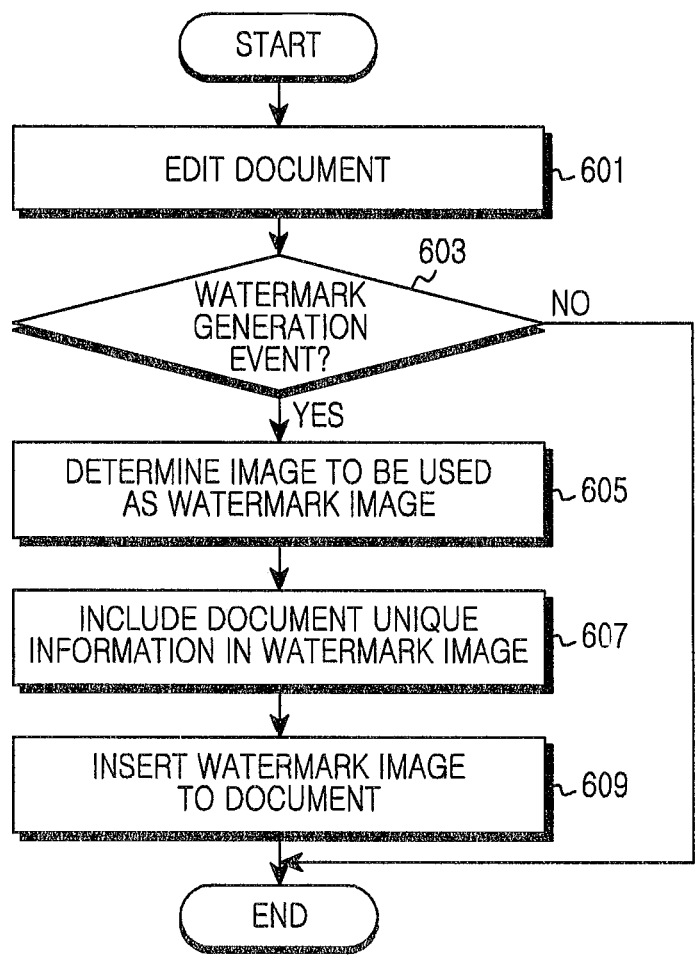

FIGS. 5 and 6 are flowcharts of processes for inserting the watermark including the document unique information to the document in the electronic device according to an exemplary embodiment of the present disclosure.

Referring to FIG. 5, the electronic device can edit the document in step 501. For example, the electronic device can provide an edit mode for inputting the content 703 by executing the memo application 701 as shown in FIG. 7A.

In step 503, the electronic device can determine whether the watermark generation event occurs. For example, the electronic device can determine whether to create the watermark of the content 703 of the memo application 701 of FIG. 7A according to user's manipulation. When the watermark generation event does not occur, the electronic device can maintain the edit mode in the memo application 701 or finish this process.

By contrast, when the watermark generation event occurs, the electronic device can include the document unique information in the watermark image in step 505. Herein, the document unique information can include at least one or a combination of the document capacity, the creation date, the modification date, the number of characters, the number of consonants, the number of vowels, the number of numerals, the number of alphabets, the number of symbols, and the number of images. The electronic device may encrypt and include the document unique information in the image. The electronic device can display the image including the watermark by adding a watermark tag to the watermark image.

In step 507, the electronic device can insert the watermark image to the document. For example, the electronic device can insert the watermark image 711 including the document unique information to the content 703 of the memo application 701 as shown in FIG. 7B.

Next, the electronic device can finish this process.

Referring to FIG. 6, the electronic device can edit the document in step 601. For example, the electronic device can provide the edit mode for inputting the content 703 by executing the memo application 701 as shown in FIG. 7A.

In step 603, the electronic device can determine whether the watermark generation event occurs. For example, the electronic device can determine whether to create the watermark of the content 703 of the memo application 701 of FIG. 7A according to the user's manipulation. When the watermark generation event does not occur, the electronic device can maintain the edit mode in the memo application 701 or finish this process.

By contrast, when the watermark generation event occurs, the electronic device can determine the image to be used as the watermark image in step 605. For example, the electronic device can determine one of at least one image stored in the memory, as the watermark image according to the user's selection. For example, the electronic device may determine the image captured by the camera as the watermark image. For example, the electronic device may determine the sign input by the user as the watermark image.

In step 607, the electronic device can include the document unique information in the watermark image. Herein, the document unique information can include at least one or a combination of the document capacity, the creation date, the modification date, the number of characters, the number of consonants, the number of vowels, the number of numerals, the number of alphabets, the number of symbols, and the number of images. The electronic device may encrypt and include the document unique information in the image. The electronic device can display the image including the watermark by adding the watermark tag to the watermark image.

In step 609, the electronic device can insert the watermark image to the document. For example, in the document of the content, the electronic device can insert the watermark image 711 including the document unique information to the content 703 of the memo application 701 as shown in FIG. 7B.

Next, the electronic device can finish this process.

Figure 8:
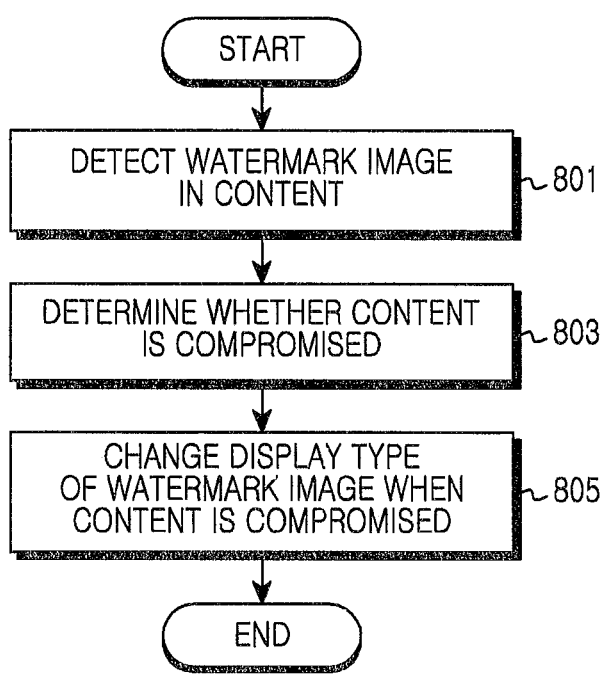
FIG. 8 is a flowchart of a process for changing a display type of the watermark when the content is compromised in the electronic device according to an exemplary embodiment of the present disclosure.

FIG. 8 is a flowchart of a process for changing a display type of the watermark when the content is compromised in the electronic device according to an exemplary embodiment of the present disclosure.

Referring to FIG. 8, the electronic device can detect the watermark image in the content in step 801. Herein, the content can include the document, the image, the video, or their combination. For example, in the document of the content, the electronic device can detect the image including the watermark tag in images of a memo 1003 in FIGS. 10A through 10E.

In step 803, the electronic device can determine whether the content is compromised. For example, the electronic device can determine whether the content is compromised by comparing the unique information of the memo 1003 with the original memo unique information of the watermark image in FIGS. 10A through 10E. In so doing, it is assumed that the original memo is the memo of FIG. 7B. Herein, the document unique information can include at least one or a combination of the document capacity, the creation date, the modification date, the number of characters, the number of consonants, the number of vowels, the number of numerals, the number of alphabets, the number of symbols, and the number of images.

Figure 10A:
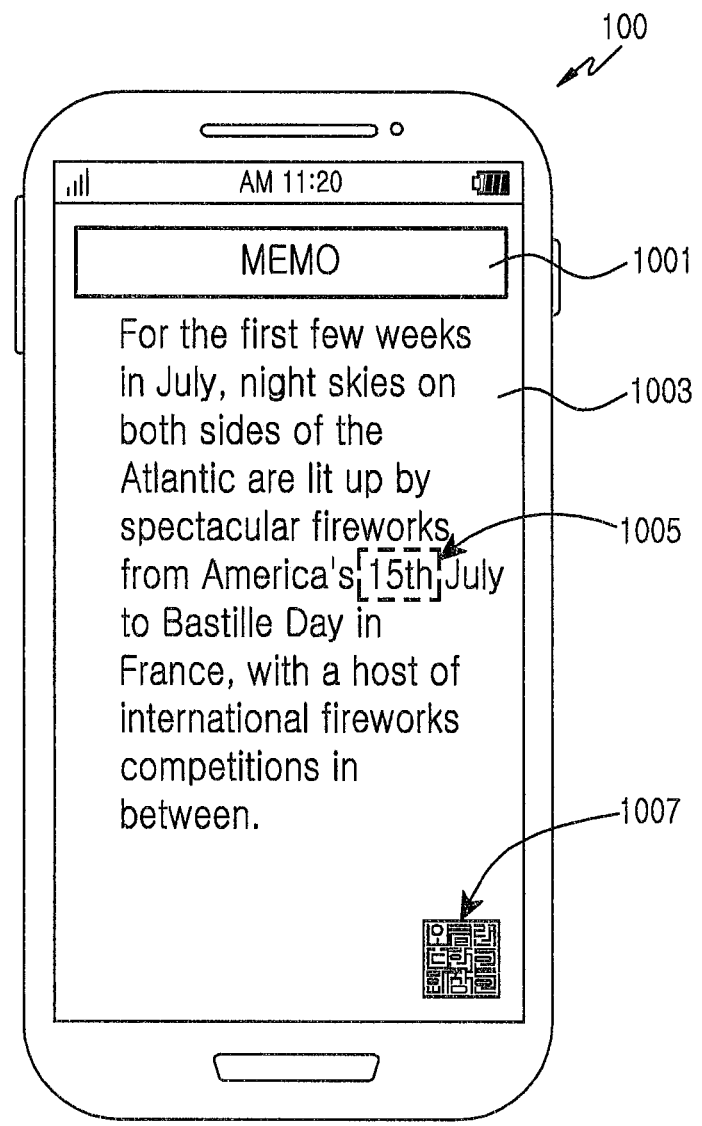
FIGS. 10A through 10E illustrate examples of the screen for changing the display type of the watermark when the document is compromised in the electronic device according to an exemplary embodiment of the present disclosure.
Figure 10B:
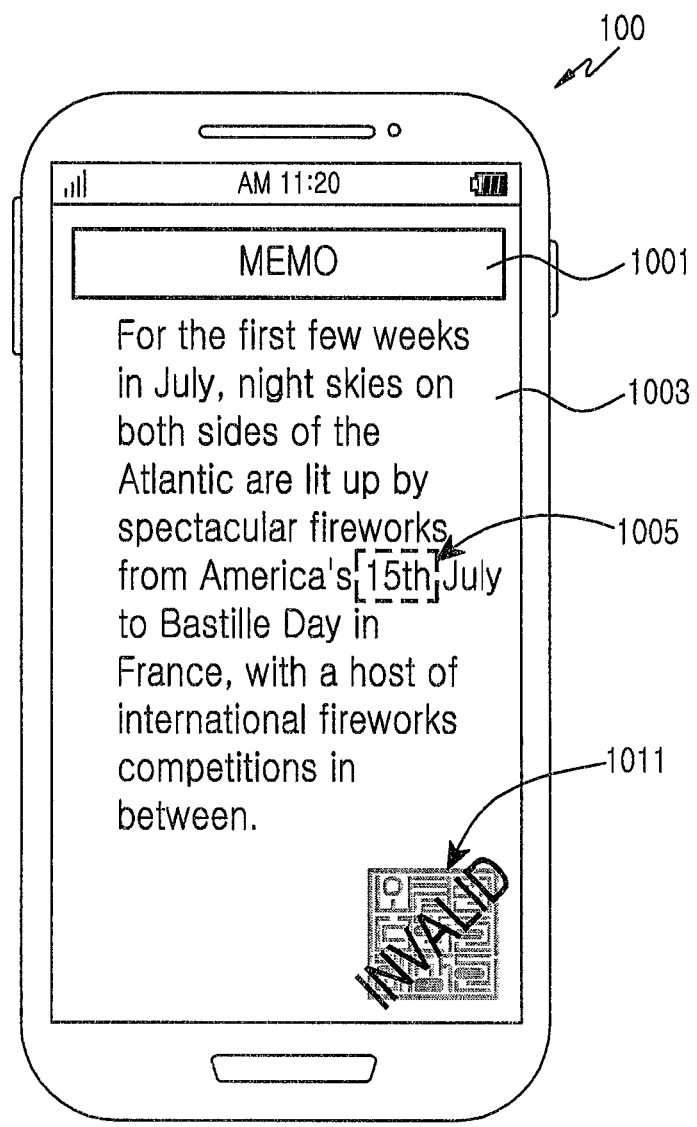
Figure 10C:
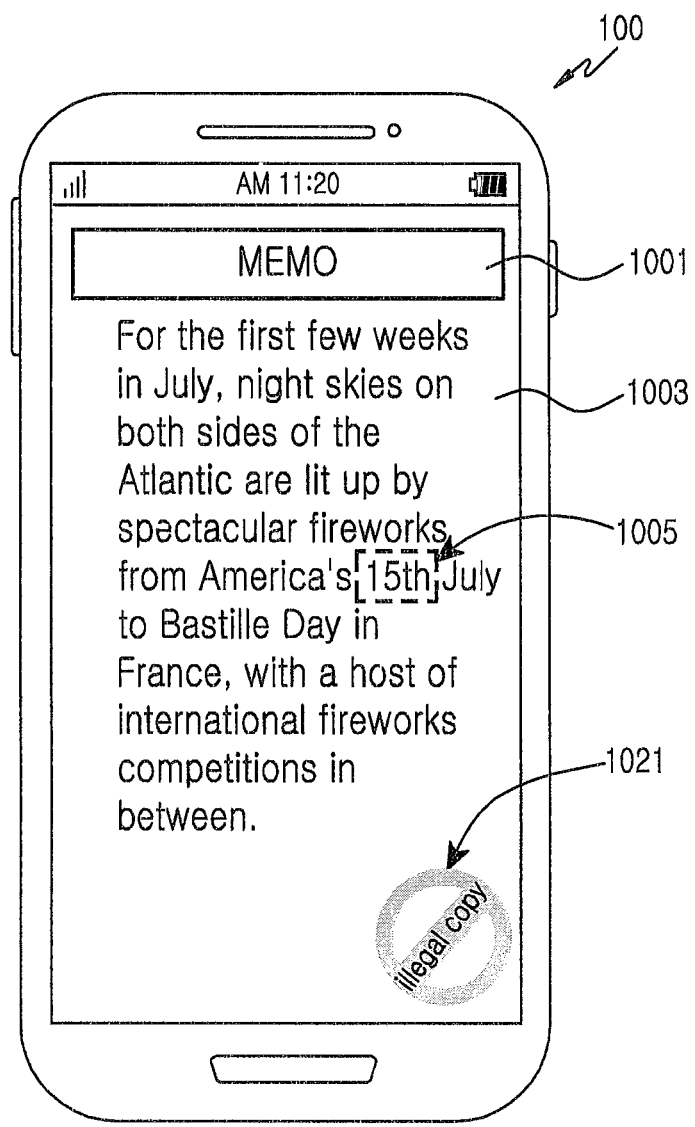
Figure 10D:
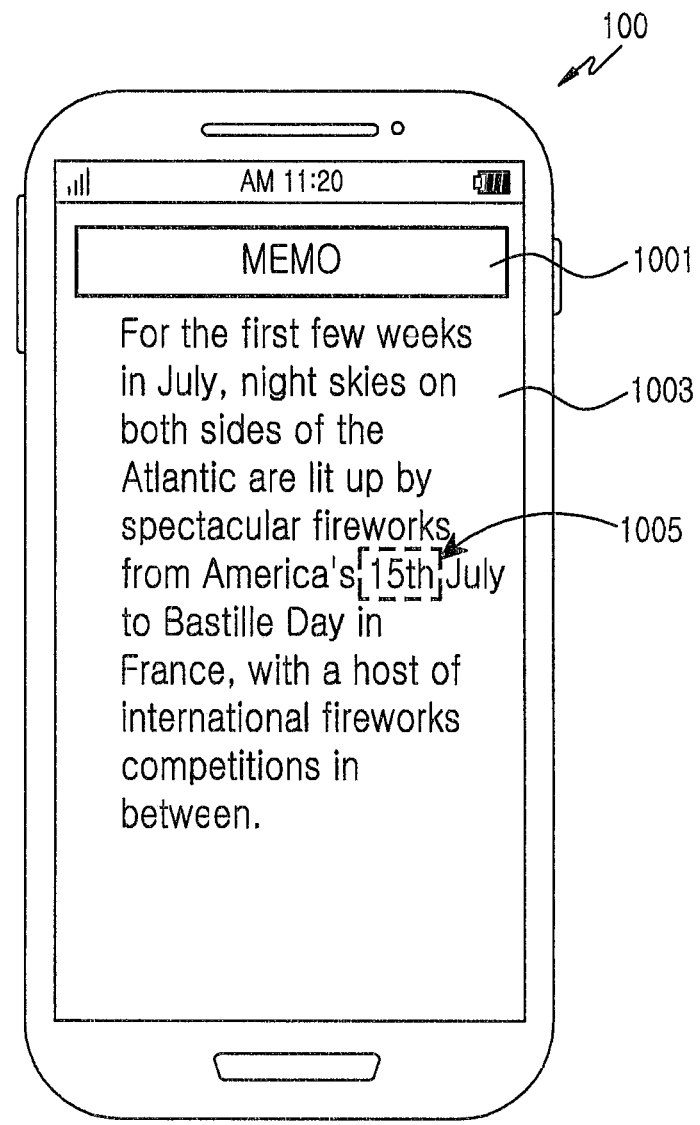
Figure 10E:
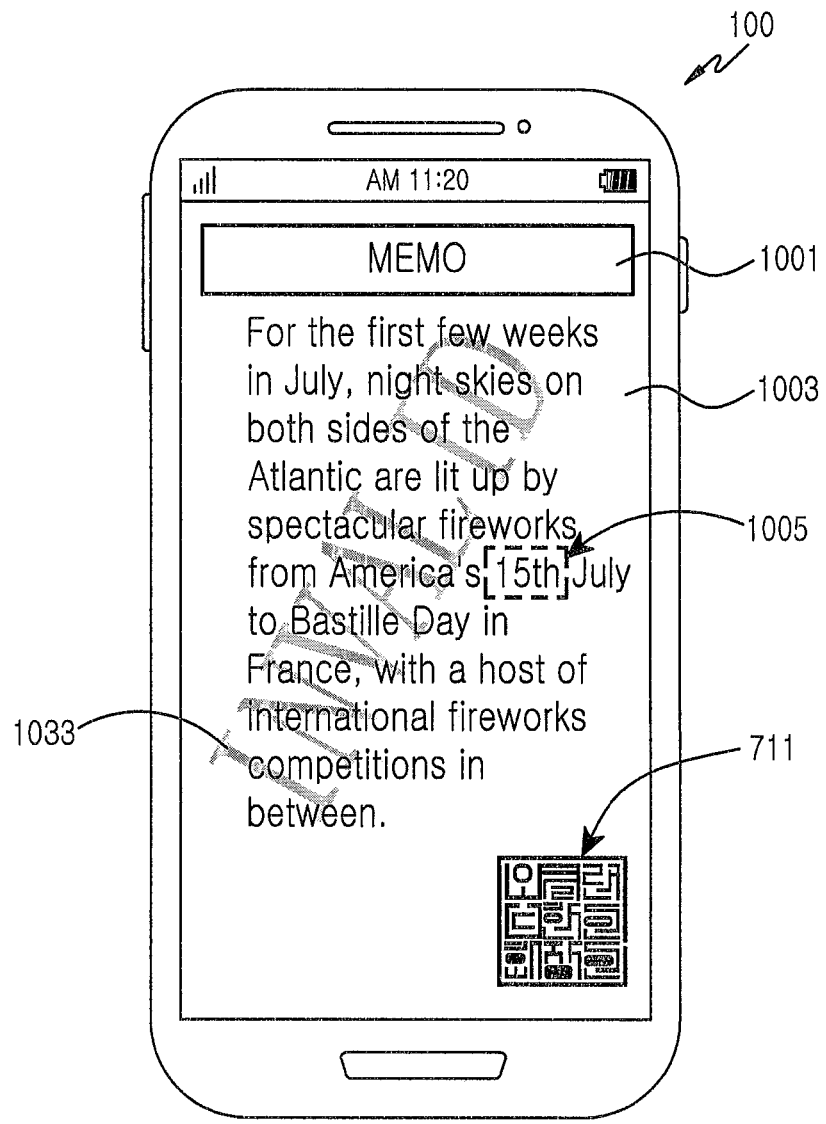

In step 805, the electronic device can change the display type of the watermark image when the content is compromised. When the unique information of the original memo 703 of FIG. 7B is different from the unique information of the memo 1003 of FIGS. 10A through 10E, the electronic device can recognize the compromised document. For example, when part 705 of the original memo 703 of FIG. 7B is changed to part 1005 of the memo 1003 of FIGS. 10A through 10E, the electronic device can recognize that the number of numerals of the original memo 703 is different from the number of numerals of the memo 1003 of FIGS. 10A through 10E. As the number of numerals of the memo differs, the electronic device may recognize different memo capacities. At this time, the electronic device can change and display the size 1007 of the original watermark 711 of FIG. 7B as shown in FIG. 10A. The electronic device may include and display predefined text 1011 in the original watermark 711 of FIG. 7B as shown in FIG. 10B. The electronic device may display an image 1021 different from the original watermark 711 of FIG. 7B as shown in FIG. 10C. The electronic device may remove the original watermark 711 of FIG. 7B as shown in FIG. 10D. In addition, the electronic device may display predefined text 1033 separately from the original watermark 711 of FIG. 7B as shown in FIG. 10E.

Next, the electronic device can finish this process.

Figure 9:
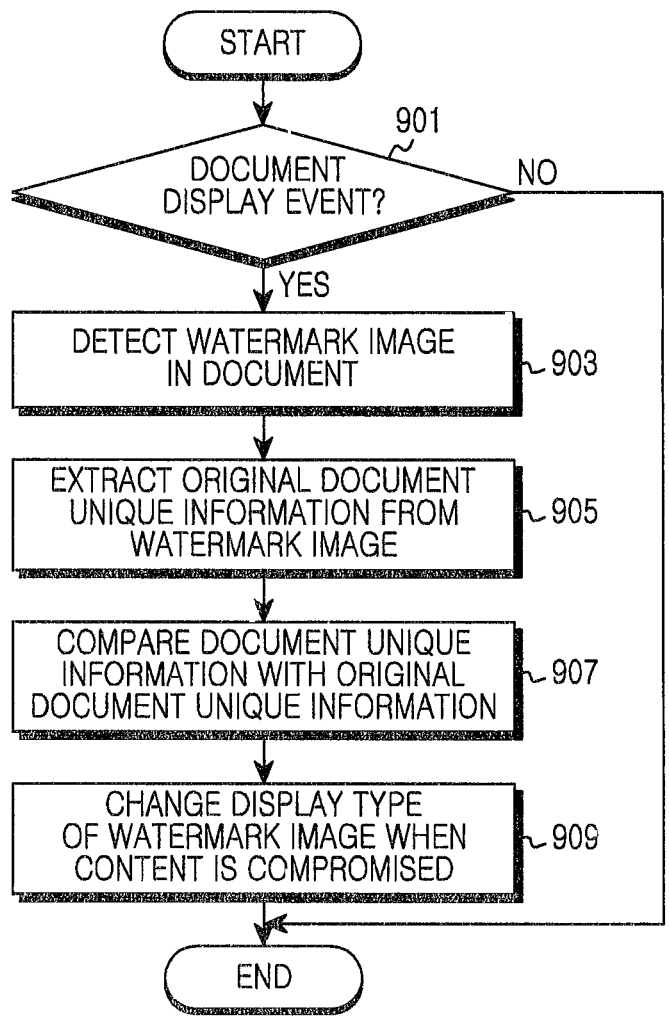
FIG. 9 is a flowchart of a process for changing the display type of the watermark when the document is compromised in the electronic device according to an exemplary embodiment of the present disclosure.

Referring to FIG. 9, the electronic device can determine whether a document display event occurs in step 901. For example, the electronic device can determine whether the display event for one memo stored in the memory takes place by running the memo application 1001 as shown in FIGS. 10A through 10E. When the document display event does not occur, the electronic device can finish this process.

By contrast, when the document display event occurs, the electronic device can detect the watermark image in the document in step 903. For example, the electronic device can detect the image including the watermark tag in the images of the memo content 1003 as shown in FIGS. 10A through 10E.

In step 905, the electronic device can extract the unique information of the original document from the watermark image. For example, the electronic device can extract the unique information of the original document from the watermark of the memo content 1003 as shown in FIGS. 10A through 10E. Herein, the document unique information can include at least one or a combination of the document capacity, the creation date, the modification date, the number of characters, the number of consonants, the number of vowels, the number of numerals, the number of alphabets, the number of symbols, and the number of images.

In step 907, the electronic device can compare the document unique information with the original document unique information. For example, the electronic device can compare the unique information of the memo 1003 of FIGS. 10A through 10E with the original memo unique information of the watermark image. At this time, the original memo is assumed to be the memo of FIG. 7B.

In step 909, when the document is compromised, the electronic device can change the display type of the watermark image. When the unique information of the original memo 703 of FIG. 7B is different from the unique information of the memo 1003 of FIGS. 10A through 10E, the electronic device can recognize the compromised document. For example, when part 705 of the original memo 703 of FIG. 7B is changed to part 1005 of the memo 1003 of FIGS. 10A through 10E, the electronic device can recognize that the number of numerals of the original memo 703 is different from the number of numerals of the memo 1003 of FIGS. 10A through 10E. As the number of numerals of the memo differs, the electronic device may recognize different memo capacities. At this time, the electronic device can change and display the size 1007 of the original watermark 711 of FIG. 7B as shown in FIG. 10A. The electronic device may include and display the predefined text 1011 in the original watermark 711 of FIG. 7B as shown in FIG. 10B. The electronic device may display the image 1021 different from the original watermark 711 of FIG. 7B as shown in FIG. 10C. The electronic device may remove the original watermark 711 of FIG. 7B as shown in FIG. 10D. In addition, the electronic device may display the predefined text 1033 separately from the original watermark 711 of FIG. 7B as shown in FIG. 10E.

Next, the electronic device can finish this process.

As set forth above, the electronic device inserts the watermark including the content unique information to the content, and changes the display type of the watermark when the content is compromised. Therefore, the user of the electronic device can check whether or not the original content is compromised.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further; such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method of operating an electronic device, the method comprising:
   generating an original content comprising first information;
   generating a watermark image based on the first information;
   inserting the watermark image into the original content;
   changing the watermark image based on a difference between the first information and second information, wherein the second information is included in a modified content with respect to the original content; and
   displaying the changed watermark image on the modified content.

2. The method of claim 1, wherein at least one of the original content or the modified content comprises at least one of a document, an image or a video.

3. The method of claim 1, wherein, if at least one of the original content or the modified content is a document, at least one of the first information or the second information comprises at least one of a document capacity, a creation date, a modification date, a number of characters, a number of consonants, a number of vowels, a number of numerals, a number of alphabets, a number of symbols, or a number of images.

4. The method of claim 1, further comprising:
   encrypting the first information; and
   inserting the encrypted first info nation to the watermark image.

5. A method for operating an electronic device, the method comprising:
   detecting a watermark image for a content to be displayed;
   extracting first information from the watermark image;
   changing the watermark image based on a difference between the first information and second information, wherein the second information is included in the content; and
   displaying the changed watermark image on the content.

6. The method of claim 5, wherein the changed watermark image is generated by at least one of a change in a size of the watermark image, a display of an image different from the watermark image, a display of predefined text on the watermark image, or a removal of the watermark image.

7. An electronic device comprising:
   at least one processor configured to:
      generate an original content comprising first information;
      generate a watermark image based on the first information;
      insert the watermark image to the original content;
      change the watermark image based on a difference between the first information and second information, wherein the second information is included in a modified content with respect to the original content; and
   a display configured to display the changed watermark image on the modified content.

8. The electronic device of claim 7, wherein at least one of the original content or the modified content comprises at least one of a document, an image, or a video.

9. The electronic device of claim 7, wherein, if at least one of the original content or the modified content is a document, at least one of the first information or the second information comprises at least one of a document capacity, a creation date, a modification date, a number of characters, a number of consonants, a number of vowels, a number of numerals, a number of alphabets, a number of symbols, or a number of images.

10. The electronic device of claim 7, wherein the processor is further configured to:
encrypt the first information; and
insert the encrypted first information to the watermark image.

11. An electronic device comprising:
at least one processor configured to:
detect a watermark image for a content to be displayed;
extract first information from the watermark image;
change the watermark image based on a difference between the first information and second information, wherein the second information is included in the content; and
a display configured to display the changed watermark image on the content.

12. The electronic device of claim 11, wherein the changed watermark image is generated by at least one of a change in a size of the watermark image, a display of an image different from the watermark image, a display of predefined text on the watermark image, or a removal of the watermark image.

13. The method of claim 5, further comprising:
comparing the first information with the second information; and
if the first information and the second information are not identical, changing the watermark image, wherein the first information is included in an original content, and wherein the content is modified with respect to the original content.

14. The method of claim 5, wherein at least one of an original content or a modified content comprises at least one of a document, an image, or a video.

15. The method of claim 5, wherein, if at least one of an original content or a modified content is a document, at least one of the first information or the second information comprises at least one of a document capacity, a creation date, a modification date, a number of characters, a number of consonants, a number of vowels, a number of numerals, a number of alphabets, a number of symbols, or a number of images.

16. The electronic device of claim 11, wherein the at least one processor is further configured to:
compare the first information with the second information; and
if the first information and the second information are not identical, change the watermark image,
wherein the first information is included in an original content, and
wherein the content is modified with respect to the original content.

17. The electronic device of claim 11, wherein at least one of an original content or a modified content comprises at least one of a document, an image, or a video.

18. The electronic device of claim 11, wherein, if at least one of an original content or a modified content is a document, at least one of the first information or the second information comprises at least one of a document capacity, a creation date, a modification date, a number of characters, a number of consonants, a number of vowels, a number of numerals, a number of alphabets, a number of symbols, or a number of images.

19. The method of claim 13, further comprising, if the first information and the second information are not identical, displaying predefined text separately from the watermark image.

20. The electronic device of claim 16, wherein, if the first information and the second information are not identical, the processor is further configured to cause a display unit to display predefined text separately from the watermark image.

* * * * *